United States Patent
Hamabe et al.

(10) Patent No.: US 11,884,156 B2
(45) Date of Patent: Jan. 30, 2024

(54) VEHICLE DISPLAY CONTROL DEVICE, VEHICLE DISPLAY DEVICE, VEHICLE, VEHICLE DISPLAY CONTROL METHOD, NON-TRANSITORY RECORDING MEDIUM

(71) Applicant: TOYOTA JIDOSHA KABUSHIKI KAISHA, Toyota (JP)

(72) Inventors: Ryota Hamabe, Nisshin (JP); Keigo Hori, Toyota (JP); Takahiro Hirota, Nukata-gun (JP); Yoshinori Murata, Toyota-shi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/879,322

(22) Filed: Aug. 2, 2022

(65) Prior Publication Data

US 2023/0096390 A1 Mar. 30, 2023

(30) Foreign Application Priority Data

Sep. 24, 2021 (JP) .................................. 2021-156128

(51) Int. Cl.
*B60K 35/00* (2006.01)
*G06F 3/14* (2006.01)
(Continued)

(52) U.S. Cl.
CPC .............. *B60K 35/00* (2013.01); *G06F 3/011* (2013.01); *G06F 3/1423* (2013.01); *B60K 2370/111* (2019.05); *B60K 2370/139* (2019.05); *B60K 2370/1446* (2019.05); *B60K 2370/152* (2019.05); *B60K 2370/1529* (2019.05); *B60K 2370/162* (2019.05); *B60K 2370/52* (2019.05); *B60K 2370/782* (2019.05); *B60Q 1/0082* (2013.01); *B60W 50/14* (2013.01); *B60W 2050/146* (2013.01); *G09G 2354/00* (2013.01); *G09G 2380/10* (2013.01)

(58) Field of Classification Search
CPC ............ B60K 35/00; B60K 2370/1446; B60K 2370/1529; B60K 2370/111; B60K 2370/139; B60K 2370/162; B60K 2370/782; B60K 2370/52; B60K 2370/152; G06F 3/011; G06F 3/1423; B60Q 1/0082; G09G 2380/10; G09G 2354/00; B60W 2050/146; B60W 50/14
See application file for complete search history.

(56) References Cited

U.S. PATENT DOCUMENTS

2007/0182537 A1* 8/2007 Abe .......................... G01P 1/08
340/441
2015/0344059 A1* 12/2015 Kim ....................... G06F 3/0219
345/184

(Continued)

FOREIGN PATENT DOCUMENTS

JP 2017-087980 A 5/2017

*Primary Examiner* — Douglas M Wilson
(74) *Attorney, Agent, or Firm* — Oliff PLC (57) ABSTRACT

A processor controls a first display section and a second display section provided to a vehicle such that when an occupant of the vehicle has performed a first operation while in a state in which a message is being displayed on the first display section and the second display section, the message is cleared from the first display section and the message continues to be displayed on the second display section.

12 Claims, 7 Drawing Sheets

(51) Int. Cl.
*G06F 3/01* (2006.01)
*B60Q 1/00* (2006.01)
*B60W 50/14* (2020.01)

(56) References Cited

U.S. PATENT DOCUMENTS

2017/0129401 A1 5/2017 Matsuoka et al.
2021/0291654 A1* 9/2021 Saito ........................ B60T 17/22
2022/0055482 A1* 2/2022 Brissman ............... B62D 1/046

* cited by examiner

| PRIORITY RANK | MESSAGE |
|---|---|
| 5 | XXXX IS FAULTY |
| 4 | BRAKE NOW! |
| 3 | PLEASE BRAKE |
| 2 | VEHICLE AHEAD HAS STARTED MOVING |
| 1 | SPEED CONTROL ACTIVATED |

VEHICLE DISPLAY CONTROL DEVICE, VEHICLE DISPLAY DEVICE, VEHICLE, VEHICLE DISPLAY CONTROL METHOD, NON-TRANSITORY RECORDING MEDIUM

CROSS-REFERENCE TO RELATED APPLICATION

This application is based on and claims priority under 35 USC 119 from Japanese Patent Application No. 2021-156128 filed on Sep. 24, 2021, the disclosure of which is incorporated by reference herein.

BACKGROUND

Technical Field

The present disclosure relates to a vehicle display control device, a vehicle display device, a vehicle, a vehicle display control method, and a non-transitory recording medium.

Related Art

An invention disclosed in Japanese Patent Application Laid-Open (JP-A) No. 2017-087980 displays various information on a display provided to an instrument panel of a vehicle and on a head-up display.

There is room for improvement with the invention of JP-A No. 2017-087980 in relation to displaying information on the display provided to the instrument panel and on the head-up display so as to make it unlikely that an occupant would feel bothered and so as to reduce concerns that the occupant would become unable to perceive the information being displayed.

In consideration of the above circumstances, an object of the present disclosure is to obtain a vehicle display control device, a vehicle display device, a vehicle, a vehicle display control method, and a non-transitory recording medium that are capable of displaying a prescribed message on a first display section and a second display section provided to a vehicle, while making it unlikely that an occupant would feel bothered and while reducing concerns that the occupant would become unable to perceive the information being displayed.

SUMMARY

A vehicle display control device according to a first aspect of the present disclosure includes a processor, wherein the processor is configured to control a first display section provided at a vehicle and a second display section that is a display section different from the first display section and also provided at the vehicle, such that, when an occupant of the vehicle has performed a first operation while in a state in which a message is being displayed on the first display section and the second display section, the message is cleared from the first display section and the message continues to be displayed on the second display section.

In the vehicle display control device according to the first aspect of the present disclosure, the message is cleared from the first display section when the occupant of the vehicle has performed the first operation while in a state in which the message is being displayed on the first display section and the second display section provided at the vehicle. Thus in the vehicle display control device according to the first aspect of the present disclosure, the message can be cleared from the first display section by the intent of the occupant, and so the occupant is less likely to feel bothered than in cases in which the message being displayed on first display section and the second display section is unable to be cleared by the intent of the occupant.

Moreover, in the vehicle display control device according to the first aspect of the present disclosure, the message continues to be displayed on the second display section when the occupant of the vehicle has performed the first operation while in a state in which the message is being displayed on the first display section and the second display section provided at the vehicle. Thus the occupant is able to perceive the message displayed on the second display section even when the message has been cleared from the first display section.

A vehicle display control device according to a second aspect of the present disclosure is the first aspect of the present disclosure, wherein the first operation is a prescribed operation with respect to a steering switch provided to a steering wheel of the vehicle, and the processor controls the first display section such that a steering switch image representing the steering switch is displayed when the occupant has performed the first operation while in a state in which the message is being displayed on the first display section and the second display section.

In the second aspect of the present disclosure the steering switch image representing the steering switch is displayed on the first display section when the occupant has performed the first operation with respect to the steering switch. This accordingly enables the occupant to perceive a positional relationship between the steering switch and the part of their body (for example a hand) that has performed the first operation by the occupant looking at the first display section.

A vehicle display control device according to a third aspect of the present disclosure is the second aspect of the present disclosure, wherein the first display section is capable of displaying plural types of messages having defined priority ranks of display, and the processor controls the first display section such that when the occupant has performed the first operation while in a state in which a first message, which is the message having the priority rank equal to or lower than a priority rank of the steering switch image, is being displayed on the first display section, the first message is cleared and the steering switch image is displayed, and when the occupant has performed the first operation while in a state in which a second message, which is the message having a priority rank higher than the priority rank of the steering switch image, is being displayed on the first display section, the first message continues to be displayed as it is and the steering switch image is not displayed.

In the third aspect of the present disclosure, the first message is cleared from the first display section and the steering switch image is displayed on the first display section when the occupant has performed the first operation while in a state in which the first message, which is a message having a priority rank equal to or lower than a priority rank of the steering switch, is being displayed on the first display section. This accordingly enables the occupant to perceive the steering switch image having the priority rank of the first message or higher by the occupant looking at the first display section in such cases.

Furthermore, in the vehicle display control device according to the third aspect of the present disclosure, the first message continues to be displayed on the first display section and the steering switch image is not displayed on the first display section when the occupant has performed the first operation while in a state in which the second message, which is a message having a higher priority rank than the priority rank of the steering switch image, is being displayed on the first display section. This enables the occupant to perceive the second message having the priority rank higher than that of the steering switch image by the occupant looking at the first display section in such cases.

The vehicle display control device according to the fourth aspect of the present disclosure is the second aspect of the present disclosure wherein the first operation is an operation in which part of the body of the occupant touches the steering switch.

In the fourth aspect of the present disclosure, the message is cleared from the first display section when the part of the body of the occupant has touched the steering switch. This accordingly enables the occupant to clear the message from the first display section easily.

A vehicle display control device according to a fifth aspect of the present disclosure is the first aspect of the present disclosure wherein the processor controls the second display section such that when the occupant has performed a second operation different from the first operation while in a state in which the message is being displayed on the second display section, the message is cleared from the second display section.

In the fifth aspect of the present disclosure the message is cleared from the second display section when the occupant has performed the second operation different from the first operation. This means that there is a lower possibility of the occupant mistakenly clearing the message from the first display section and the second display section than in cases in which the message is cleared from the first display section and the second display section when the first operation has been performed.

A vehicle display control device according to a sixth aspect of the present disclosure is the fifth aspect of the present disclosure wherein the second display section is capable of displaying plural types of the message having defined priority ranks of display, and the processor controls the second display section such that when the occupant has performed the second operation while in a state in which a third message, which is the message having the priority rank equal to or lower than a prescribed standard priority rank, is being displayed on the second display section, the third message is cleared from the second display section, and when the occupant has performed the second operation while in a state in which a fourth message, which is the message having the priority rank higher than the standard priority rank, is being displayed on the second display section, the fourth message continues to be displayed as it is.

In the sixth aspect of the present disclosure the third message is cleared from the second display section when the occupant has performed the second operation while in a state in which the third message, which is a message having a priority rank equal to or lower than a prescribed standard priority rank, is being displayed on the second display section. Thus the occupant does not feel bothered by the third message being displayed on the second display section in such cases.

Moreover, in the vehicle display control device according to the sixth aspect of the present disclosure, the fourth message continues to be displayed on the second display section when the occupant has performed the second operation while in a state in which the fourth message, which is the message having the priority rank higher than the standard priority rank, is being displayed on the second display section. This accordingly enables the occupant to perceive the high priority rank fourth message by the occupant looking at the second display section even in cases in which the occupant has mistakenly performed the second operation.

The vehicle display control device according to a seventh aspect of the present disclosure is the fifth aspect of the present disclosure wherein a set display time of the message on the first display section for when the first operation is not being performed, and a set display time of the message on the second display section for when the second operation is not being performed, are set for each of the respective messages.

In the seventh aspect of the present disclosure the set display time of the message on the first display section for when the first operation is not being performed, and the set display time of the message on the second display section for when the second operation is not being performed, are set for each of the respective messages. This enables a configuration in which the occupant is less likely to feel bothered by the message displayed on the first display section and the second display section.

A vehicle display control device according to an eighth aspect of the present disclosure is the fifth aspect of the present disclosure, wherein the second operation is an operation to move a steering switch, which is provided at a steering wheel of the vehicle and is capable of moving between an initial position and a pressed position, to the pressed position.

In the eighth aspect of the present disclosure, the message is cleared from the second display section when the occupant has performed the operation to move the steering switch that is capable of moving between the initial position and the pressed position to the pressed position. Thus there is a lower possibility of the occupant mistakenly clearing the message from the second display section than cases in which the message is cleared from the second display section when part of the body has touched the steering switch.

A vehicle display control device according to a ninth aspect of the present disclosure is the first aspect of the present disclosure wherein the first display section is a head-up display.

In the ninth aspect of the present disclosure, the message displayed on the head-up display can be cleared when the occupant has performed the first operation.

The vehicle display control device according to a tenth aspect of the present disclosure is the first aspect of the present disclosure, wherein the second display section is a display installed at a vehicle interior of the vehicle.

In the tenth aspect of the present disclosure the display installed at the vehicle interior of the vehicle is able to display the message.

A vehicle display device of an eleventh aspect of the present disclosure includes the vehicle display control device of the first aspect of the present disclosure, the first display section, and the second display section.

A vehicle according to a twelfth aspect of the present disclosure includes the vehicle display device according to the eleventh aspect of the present disclosure.

A vehicle display control method according to a thirteenth aspect of the present disclosure includes, by a processor, controlling a first display section provided at a vehicle and a second display section that is a display section different from the first display section and also provided at the vehicle, such that, when an occupant of the vehicle has performed a first operation while in a state in which a prescribed message is being displayed on the first display section and the second display section, the message is cleared from the first display section and the message continues to be displayed on the second display section.

A non-transitory recording medium according to a fourteenth aspect of the present disclosure is a non-transitory recording medium stored with a program executable by a computer so as to execute processing. The processing includes controlling a first display section provided at a vehicle and a second display section that is a display section different from the first display section and also provided at the vehicle, such that, when an occupant of the vehicle has performed a first operation while in a state in which a prescribed message is being displayed on the first display section and the second display section, the message is cleared from the first display section and the message continues to be displayed on the second display section.

As described above, the vehicle display control device, the vehicle display device, the vehicle, the vehicle display control method, and the non-transitory recording medium according to the present disclosure exhibit the excellent advantageous effects of enabling a prescribed message to be displayed on a first display section and a second display section provided to a vehicle while making it unlikely that an occupant feels bothered and while reducing concerns that the occupant would become unable to perceive the information displayed.

BRIEF DESCRIPTION OF THE DRAWINGS

Exemplary embodiments of the present invention will be described in detail based on the following figures, wherein.

DETAILED DESCRIPTION

Description follows regarding exemplary embodiments of a vehicle display control device, a vehicle display device, a vehicle, a vehicle display control method, and a non-transitory recording medium according to the present disclosure, with reference to the drawings.

Figure 1:
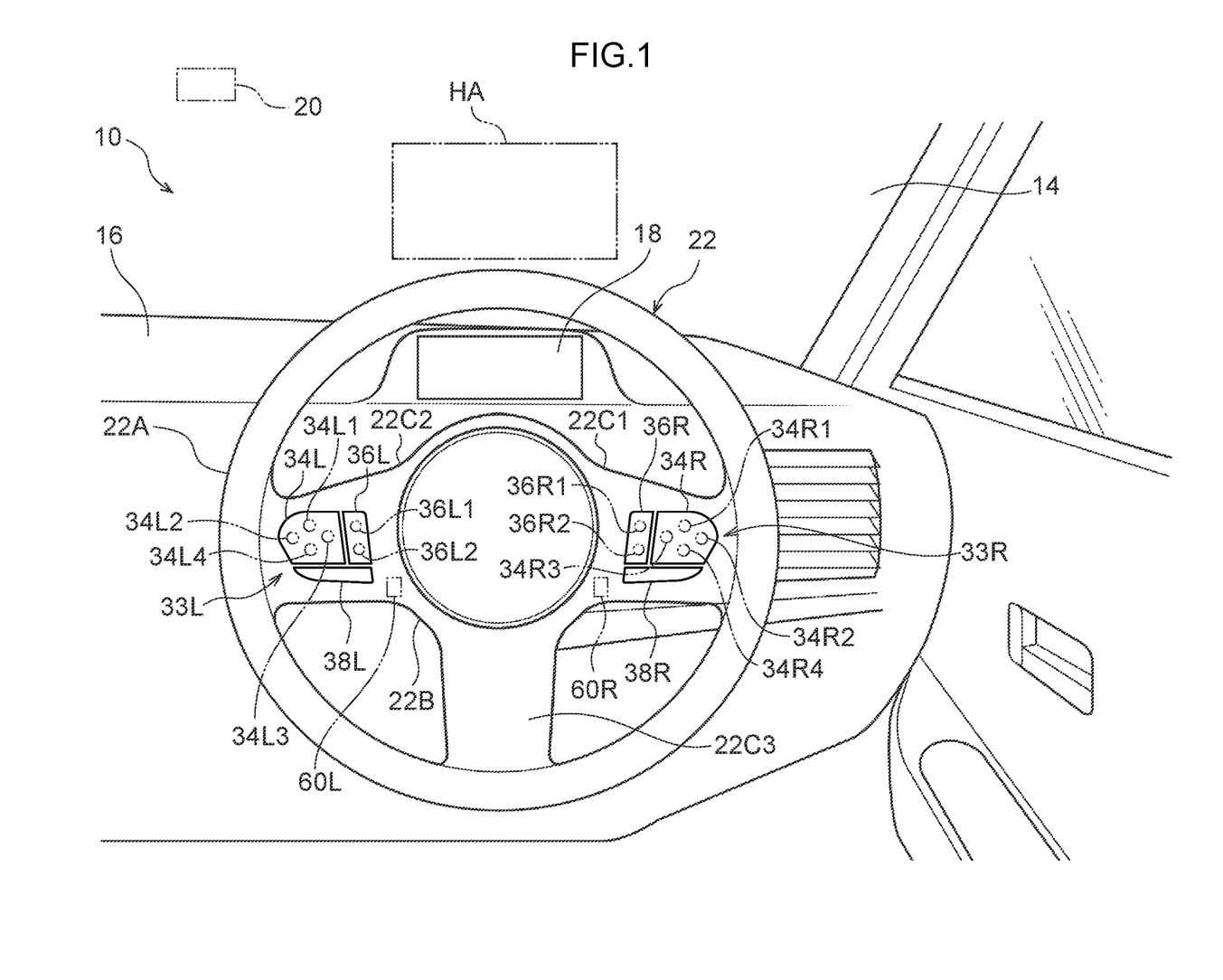
FIG. 1 is a diagram illustrating an interior of a vehicle equipped with a vehicle display control device according to an exemplary embodiment.

A vehicle 10 of the present exemplary embodiment is, as illustrated in FIG. 1, equipped with a front windshield 14 and an instrument panel 16. A meter display (display) (first display section) (second display section) (vehicle display device) 18 is provided on the instrument panel 16. A sensor cluster 20 is provided at an upper portion of a vehicle inside face of the front windshield 14. The sensor cluster 20 includes at least one out of a camera, a laser imaging detection and ranging (LIDAR) sensor, a locator camera, or a millimeter wave radar sensor.

Figure 4:
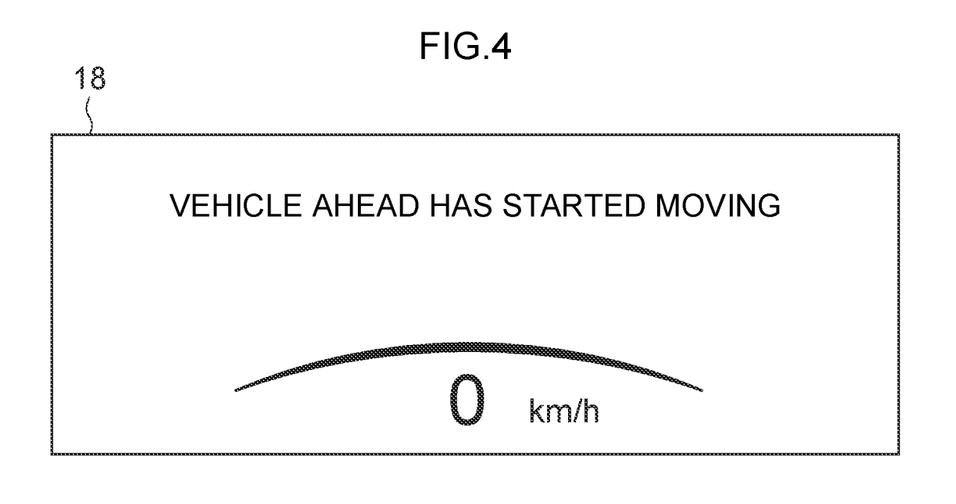
FIG. 4 is a diagram illustrating a meter display with a prescribed message displayed thereon.

The meter display (MET) 18 provided on the instrument panel 16 is controlled by a display control ECU (vehicle display control device) (vehicle display device) 26, described later. The display control ECU 26 is connected to various meter instruments installed in the vehicle 10. Information related to a vehicle speed of the vehicle 10 is accordingly displayed on the meter display 18, for example as illustrated in FIG. 4.

Figure 2:
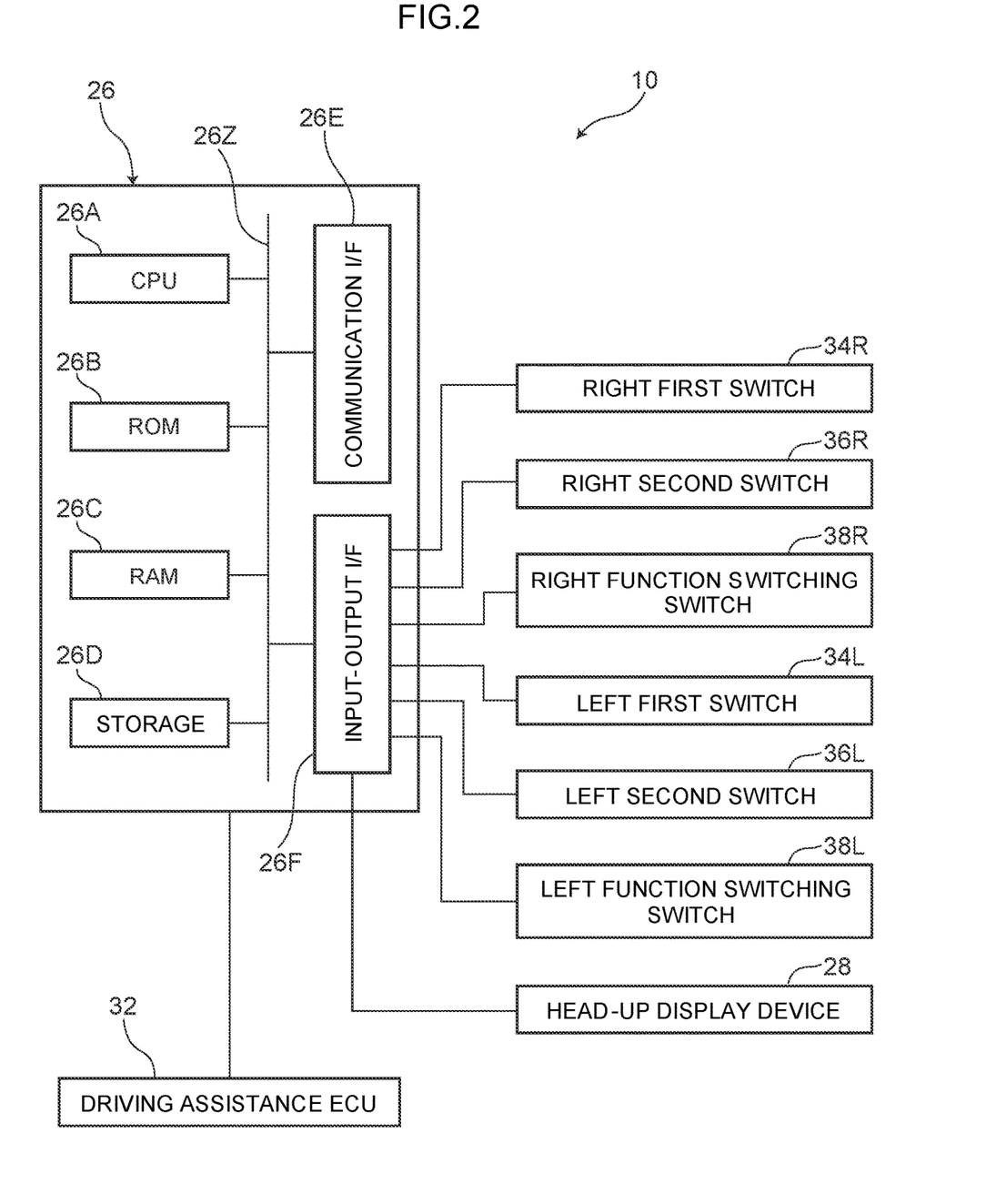
FIG. 2. is a diagram illustrating a hardware configuration of the vehicle illustrated in FIG. 1.
Figure 5:
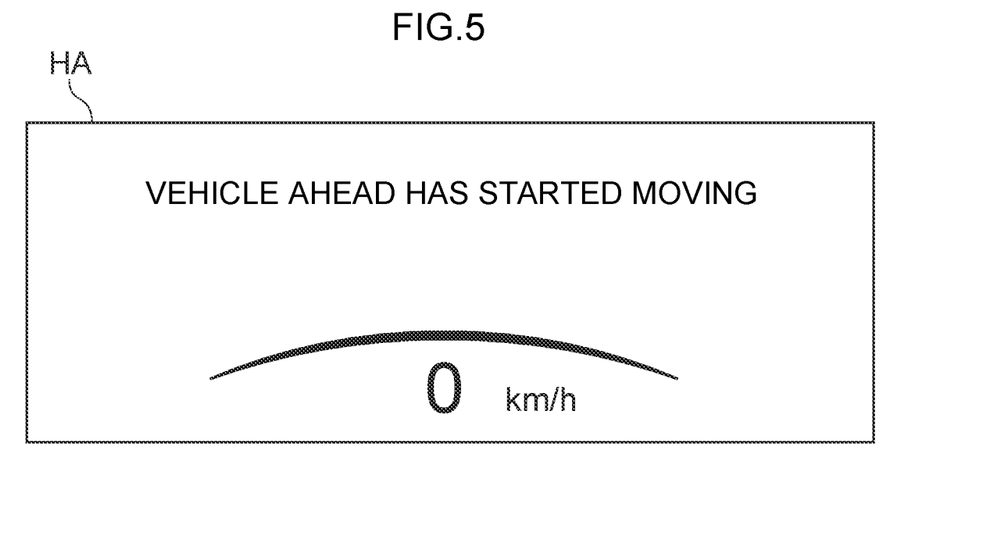
FIG. 5 is a diagram illustrating a display area of a head-up display with a prescribed message displayed thereon.

A display area (first display section) (second display section) HA is formed on the front windshield 14. The display area HA is provided at a vehicle upper side of the meter display 18. An image generated by a projection device of a head-up display (first display section) (second display section) (vehicle display device) (hereinafter HUD) 28 (see FIG. 2) provided to the vehicle 10 is projected onto the display area HA. The HUD 28 is connected to the display control ECU 26, as illustrated in FIG. 2. Thus information related to the vehicle speed of the vehicle 10 is displayed on the display area HA, such as illustrated in FIG. 5.

As illustrated in FIG. 1, a steering wheel 22 is supported by the instrument panel 16 so as to be able to rotate. The steering wheel 22 is equipped with a rim section 22A, a hub section 22B, and spoke sections 22C1, 22C2, 22C3. The hub section 22B is provided at the inner peripheral side of the substantially ring shaped rim section 22A. The inner peripheral section of the rim section 22A and the hub section 22B are linked together by the three spoke sections 22C1, 22C2, 22C3. A steering switch 33R is provided to the right side spoke section 22C1, and a steering switch 33L is provided to the left side spoke section 22C2. The steering switch 33R includes a right first switch 34R, a right second switch 36R, and a right function switching switch 38R, which are each independent of each other. The steering switch 33L includes a left first switch 34L, a left second switch 36L, and a left function switching switch 38L, which are each independent of each other.

The substantially rectangular shaped right first switch 34R is able to swing about a swinging center (non-illustrated in the drawings) provided at a center portion thereof. The right first switch 34R is equipped with a first input section 34R1, a second input section 34R2, a third input section 34R3, and a fourth input section 34R4 positioned at the peripheral outside of the swinging center. The first input section 34R1, the second input section 34R2, the third input section 34R3, and the fourth input section 34R4 have mutually different functions. By swinging the right first switch 34R, the first input section 34R1, the second input section 34R2, the third input section 34R3, and the fourth input section 34R4 move by a small distance in a direction substantially parallel to a front-rear direction between an initial position and a pressed position. The first input section 34R1, the second input section 34R2, the third input section 34R3, and the fourth input section 34R4 are positioned in the initial position when no external force is given to the right first switch 34R, or when part of the body of an occupant has touched the first input section 34R1, the second input section 34R2, the third input section 34R3, or the fourth input section 34R4.

Note that in the present specification, reference to when part of the body of an occupant touches the first input section 34R1 means part of the body of the occupant touches the first input section 34R1 and the first input section 34R1 is positioned at the initial position. Similar applies to the second input section 34R2, the third input section 34R3, the fourth input section 34R4, the right second switch 36R (a first input section 36R1, a second input section 36R2), the right function switching switch 38R, the left first switch 34L (first input section 34L1, second input section 34L2, third input section 34L3, fourth input section 34L4), the left second switch 36L (first input section 36L1, second input section 36L2), and the left function switching switch 38L.

Furthermore, in the present specification, part of the body means a site on the body that an electrostatic sensor will be responsive to, described later. For example, a hand is a part of the body. Furthermore, sometimes part of a body of an occupant touching and operating at least one out of the right first switch 34R, the right second switch 36R, the right function switching switch 38R, the left first switch 34L, the left second switch 36L, or the left function switching switch 38L is referred to as a "first operation".

A non-illustrated electrostatic sensor is mounted to the right first switch 34R. When part of the body of the occupant touches the first input section 34R1, the second input section 34R2, the third input section 34R3, or the fourth input section 34R4 of the right first switch 34R, the function of the first input section 34R1, the second input section 34R2, the third input section 34R3, or the fourth input section 34R4 touched by the part of the body becomes in a selected state. Furthermore, the selected function is then executed when the first input section 34R1, the second input section 34R2, the third input section 34R3, or the fourth input section 34R4 is moved to the pressed position by the part of the body of the occupant. A similar electrostatic sensor is also mounted to the right second switch 36R, the right function switching switch 38R, the left first switch 34L, the left second switch 36L, and the left function switching switch 38L.

The substantially rectangular shaped right second switch 36R positioned at the left hand side of the right first switch 34R is able to swing about a swinging center (non-illustrated in the drawings) provided at a center portion thereof. The right second switch 36R is equipped with a first input section 36R1 and a second input section 36R2 respectively positioned at upper and lower sides of the swinging center. The first input section 36R1 and the second input section 36R2 have mutually different functions. By swinging the right second switch 36R, the first input section 36R1 and the second input section 36R2 move by a small distance in a direction substantially parallel to a front-rear direction between an initial position and a pressed position. When no external force is given to the right second switch 36R, or when the part of the body of the occupant has touched the first input section 36R1 or the second input section 36R2, the first input section 36R1 and the second input section 36R2 are positioned at the initial position.

The right function switching switch 38R positioned below the right first switch 34R and the right second switch 36R is a switch for switching the functions assigned to the right first switch 34R and the right second switch 36R. The right function switching switch 38R is able to move by a small distance in a direction substantially parallel to a front-rear direction between an initial position and a pressed position. The right function switching switch 38R is positioned in the initial position when no external force is given to the right function switching switch 38R or when part of the body of the occupant has touched the right function switching switch 38R. The functions assigned to the right first switch 34R and the right second switch 36R are switched when the right function switching switch 38R has been positioned at the pressed position for a time of only a prescribed threshold or less. Data related to the threshold is, for example, recorded in ROM 26B or storage 26D of the display control ECU 26 described later. As an example of the present exemplary embodiment, the first input section 34R1, the second input section 34R2, the third input section 34R3, and the fourth input section 34R4 of the right first switch 34R, and also the first input section 36R1 and the second input section 36R2 of the right second switch 36R, are each assigned with two functions. The functions assigned to the right first switch 34R (the first input section 34R1, the second input section 34R2, the third input section 34R3, and the fourth input section 34R4) and to the right second switch 36R (the first input section 36R1 and the second input section 36R2) are switched when the right function switching switch 38R is positioned in the pressed position for a time of only the threshold or less.

Moreover, sometimes part of the body of the occupant continues to position the right function switching switch 38R or the left function switching switch 38L in the pressed position for a time in excess of the threshold. Such operation on the right function switching switch 38R and the left function switching switch 38L is sometimes called a "second operation". The functions assigned to the right first switch 34R and the right second switch 36R are not switched in cases in which the second operation has been performed on the right function switching switch 38R. Similarly, the functions assigned to the left first switch 34L and the left second switch 36L are not switched in cases in which the second operation has been performed on the left function switching switch 38L. Note that cases in which an operation has been performed to move the right function switching switch 38R to the pressed position result in the first operation being performed on the right function switching switch 38R at an initial stage of the operation. Similarly, cases in which an operation has been performed to move the left function switching switch 38L to the pressed position result in the first operation being performed on the left function switching switch 38L at an initial stage of the operation.

The left first switch 34L is configured similarly to the right first switch 34R, except in that there is left-right symmetry therebetween. Namely, the left first switch 34L is able to swing about a swinging center, and includes a first input section 34L1, a second input section 34L2, a third input section 34L3, and a fourth input section 34L4 that are movable between an initial position and a pressed position. The first input section 34L1, the second input section 34L2, the third input section 34L3, and the fourth input section 34L4 have mutually different functions.

The left second switch 36L is configured similarly to the right second switch 36R, except in that there is left-right symmetry therebetween. Namely, the left second switch 36L is able to swing about a swinging center, and includes a first input section 36L1 and a second input section 36L2. The first input section 36L1 and the second input section 36L2 have mutually different functions.

The left function switching switch 38L is configured similarly to the right function switching switch 38R except in that there is left-right symmetry therebetween. Namely, the left function switching switch 38L is a switch for switching functions assigned to the first input section 34L1, the second input section 34L2, the third input section 34L3, and the fourth input section 34L4 of the left first switch 34L and functions assigned to the first input section 36L1 and the second input section 36L2 of the left second switch 36L.

The display control electronic control unit (ECU) 26 illustrated in FIG. 2 is provided to the vehicle 10. The display control ECU 26 is configured including a central processing unit (CPU: processor) 26A, a read only memory (ROM) 26B, a random access memory (RAM) 26C, a storage 26D, a communication interface (communication I/F) 26E, and an input-output interface (input-output I/F) 26F. These configuration elements are connected together through an internal bus 26Z so as to be able to communicate with each other.

The CPU 26A is a central processing unit that executes various programs and controls each section. Namely, the CPU 26A reads programs from the ROM 26B or the storage 26D and executes the programs using the RAM 26C as workspace. The CPU 26A controls each of the configuration elements and performs various arithmetical processing according to the programs recorded on the ROM 26B or the storage 26D.

The ROM 26B is stored with various programs and various data. The RAM 26C serves as workspace and is temporarily stored with programs and data. The storage 26D is configured by a hard disk drive (HDD) or a solid state drive (SSD), and is a non-transitory recording medium (recording medium) stored with various programs including an operating system and various data. In the present exemplary embodiment the program for performing input control processing and the like is stored on the ROM 26B or the storage 26D.

The communication interface 26E is an interface for the display control ECU 26 to communicate with an external server and other equipment. A standard such as, for example, controller area network (CAN), Ethernet (registered trademark), long term evolution (LTE), fiber distributed data interface (FDDI), Wi-Fi (registered trademark) or the like is employed in the communication interface 26E.

The right first switch 34R, the right second switch 36R, the right function switching switch 38R, the left first switch 34L, the left second switch 36L, the left function switching switch 38L, and the HUD 28 are electrically connected to the input-output I/F 26F.

The display control ECU 26 is electrically connected to a driving assistance ECU 32. The driving assistance ECU 32 is configured including a CPU (processor), ROM, RAM, storage, a communication interface (communication I/F), and an input-output interface (input-output I/F). These configuration elements are connected together through an internal bus so as to be able to communicate with each other. The driving assistance ECU 32 of the present exemplary embodiment is connected to the sensor cluster 20, and to various actuators for driving a brake device, a steering device, and an internal combustion engine (drive source). The driving assistance ECU 32 may also be connected to an electric motor (drive source). The driving assistance ECU 32 includes a function to execute driving assistance control of the vehicle 10 by controlling the actuators (and electric motor) described above. In the present specification, "driving assistance control" includes driving assistance control of level 1 to level 5 automation in the driving automation scale as defined by the Society of Automotive Engineers (SAE). The driving assistance control includes, for example, adaptive cruise control (ACC) and lane tracing assist (LTA).

The display control ECU 26 employs the hardware resources described above to implement various functions. The functional configuration implemented by the display control ECU 26 will now be described, with reference to FIG. 3.

Figure 3:
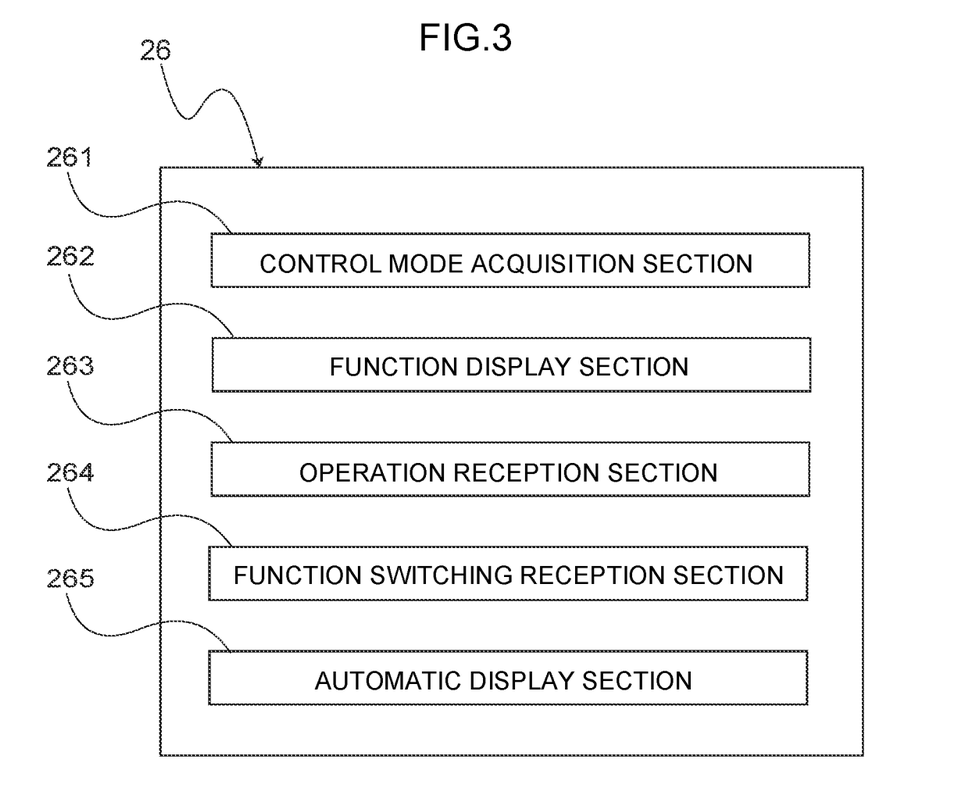
FIG. 3 is a functional block diagram of a display control ECU of the vehicle.

As illustrated in FIG. 3, the display control ECU 26 includes, as functional configuration, a control mode acquisition section 261, a function display section 262, an operation reception section 263, a function switching reception section 264, and an automatic display section 265. The control mode acquisition section 261, the function display section 262, the operation reception section 263, the function switching reception section 264, and the automatic display section 265 are implemented by the CPU 26A reading a program stored on the ROM 26B or the storage 26D and executing the program.

The control mode acquisition section 261 acquires content of driving assistance control being executed by the driving assistance ECU 32.

Figure 6:
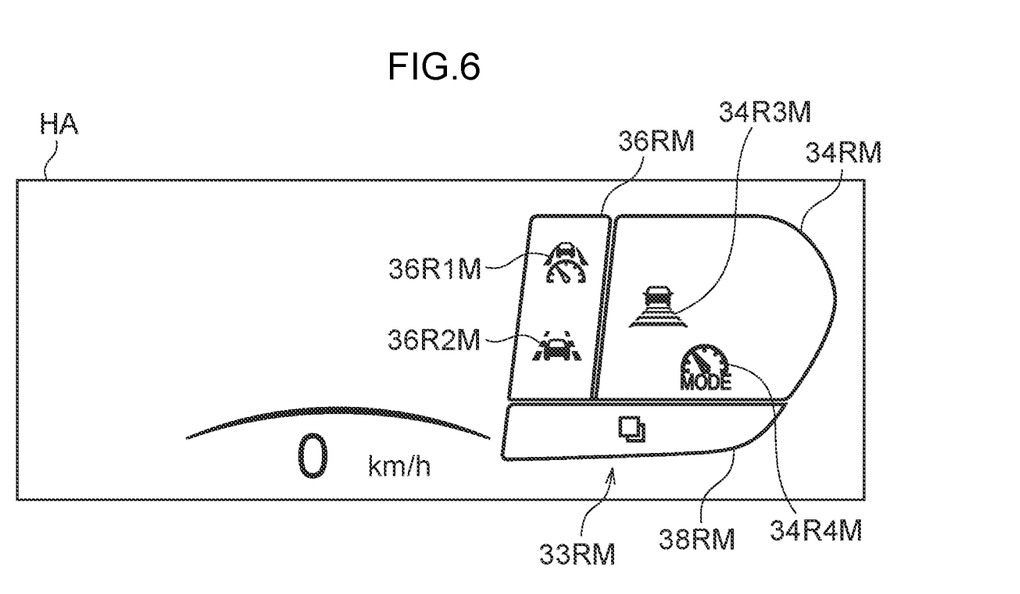
FIG. 6 is a diagram illustrating a display area of the head-up display when a driver has performed a first operation.
Figure 7:
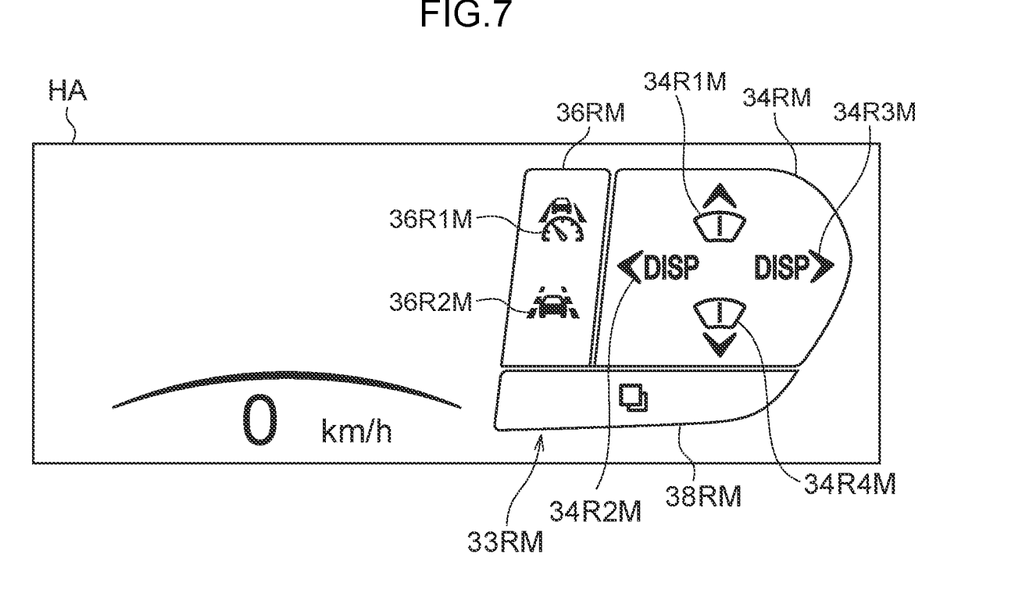
FIG. 7 is a diagram illustrating the display area of the head-up display when the driver has performed a function switching operation.

The function display section 262 displays the functions assigned to the right first switch 34R, the right second switch 36R, the left first switch 34L, and the left second switch 36L on the display area HA. For example, the function display section 262 continues to display a steering switch image 33RM on the display area HA, as illustrated in FIG. 6 and FIG. 7, while a hand of an occupant is touching the right first switch 34R, the right second switch 36R, or the right function switching switch 38R. When part of the body of the occupant moves away from the steering switch 33R, the function display section 262 clears the display of the steering switch image 33RM from the display area HA after a prescribed period of time has elapsed from the time of moving away. This prescribed period of time is, for example, 5 seconds. The steering switch image 33RM includes a right first switch image 34RM, a right second switch image 36RM, and a right function switching switch image 38RM respectively representing the right first switch 34R, the right second switch 36R, and the right function switching switch 38R. Moreover, the function display section 262 continues to display a steering switch image (not illustrated in the drawings) that is left-right symmetrical to the steering switch image 33RM on the display area HA while part of the body of the occupant is touching the left first switch 34L, the left second switch 36L, or the left function switching switch 38L. When the part of the body of the occupant moves away from the steering switch 33L, the function display section 262 clears the display of this steering switch image from the display area HA after a prescribed period of time has elapsed from the time of moving away. This prescribed period of time is, for example, 5 seconds. Note that the steering switch image 33RM and the steering switch image corresponding to the steering switch 33L are not both displayed on the display area HA at the same time. For example, if the left first switch 34L, the left second switch 36L, or the left function switching switch 38L is touched by part of the body of the occupant while the steering switch image 33RM is being displayed on the display area HA, the steering switch image 33RM is cleared from the display area HA and the steering switch image corresponding to the steering switch 33L is displayed instead.

In cases in which part of the body of the occupant is not touching the steering switch 33R or the steering switch 33L then, as illustrated in FIG. 5, the steering switch image 33RM and the steering switch image corresponding to the steering switch 33L are not displayed on the display area HA. In such cases only the information related to the vehicle speed of the vehicle 10 is displayed on the display area HA.

FIG. 6 includes, in the right first switch image 34RM, a third input section image 34R3M representing the third input section 34R3 and a fourth input section image 34R4M representing the fourth input section 34R4. Specific functions are respectively assigned to the third input section 34R3 and the fourth input section 34R4 in such cases. However, respective functions are not assigned to the first input section 34R1 and the second input section 34R2. Thus in such cases images representing the first input section 34R1 and the second input section 34R2 are not included in the right first switch image 34RM.

A function to set an inter-vehicle distance between the vehicle 10 and a leading vehicle positioned in front of the vehicle 10 is assigned to the third input section 34R3 in this example. A value set for the inter-vehicle distance is accordingly changed by the part of the body of the occupant moving the third input section 34R3 to the pressed position while the steering switch image 33RM is being displayed on the display area HA.

A function related to switching control mode is assigned to the fourth input section 34R4 in this example. The control mode of the vehicle 10 is accordingly switched when the part of the body of the occupant moves the fourth input section 34R4 to the pressed position while the steering switch image 33RM is being displayed on the display area HA.

A function to switch a radar cruise mode to an ON state or an OFF state is assigned to the first input section 36R1. Thus the radar cruise mode is switched to the ON state or the OFF state by the part of the body of the occupant moving the first input section 36R1 to the pressed position while the steering switch image 33RM is being displayed on the display area HA.

A function to switch the LTA to an ON state or an OFF state is assigned to the second input section 36R2. The LTA is accordingly switched to the ON state or the OFF state by the part of the body of the occupant moving the second input section 36R2 to the pressed position while the steering switch image 33RM is being displayed on the display area HA.

The operation reception section 263 receives input of the right first switch 34R, the right second switch 36R, the left first switch 34L, and the left second switch 36L. Specifically, the operation reception section 263 executes the function of a switch that was moved to the pressed position when the right first switch 34R or the right second switch 36R has been moved to the pressed position while the steering switch image 33RM is being displayed on the display area HA. The operation reception section 263 executes the function of a switch that was moved to the pressed position when the left first switch 34L or the left second switch 36L has been moved to the pressed position while the steering switch image corresponding to the steering switch 33L was being displayed on the display area HA.

The function switching reception section 264 receives input from the right function switching switch 38R in cases in which the steering switch image 33RM is being displayed on the display area HA. Furthermore, the function switching reception section 264 receives input from the left function switching switch 38L in cases in which the steering switch image corresponding to the steering switch 33L is being displayed on the display area HA. Specifically, the function switching reception section 264 switches the functions of the right first switch 34R and the right second switch 36R when the right function switching switch 38R is positioned in the pressed position for a time of only the threshold or less while the steering switch image 33RM is in a displayed state on the display area HA. The function switching reception section 264 switches the functions of the left first switch 34L and the left second switch 36L when the left function switching switch 38L is positioned in the pressed position for a time of only the threshold or less while the steering switch image corresponding to the steering switch 33L is in a displayed state on the display area HA. A function for function switching is accordingly assigned to the right function switching switch 38R and the left function switching switch 38L.

For example, when the right function switching switch 38R is positioned in the pressed position for a time of only the threshold or less in the state illustrated in FIG. 6, the display area HA is transitioned by the function display section 262 to the state illustrated in FIG. 7. Namely, as illustrated in FIG. 7, a first input section image 34R1M, a second input section image 34R2M, a third input section image 34R3M, and a fourth input section image 34R4M are changed from the images displayed in FIG. 6. The occupant looking at the first input section image 34R1M, the second input section image 34R2M, the third input section image 34R3M, and the fourth input section image 34R4M is thereby able to perceive that the functions assigned to the first input section 34R1, the second input section 34R2, the third input section 34R3, and the fourth input section 34R4 have been switched.

Figure 8:
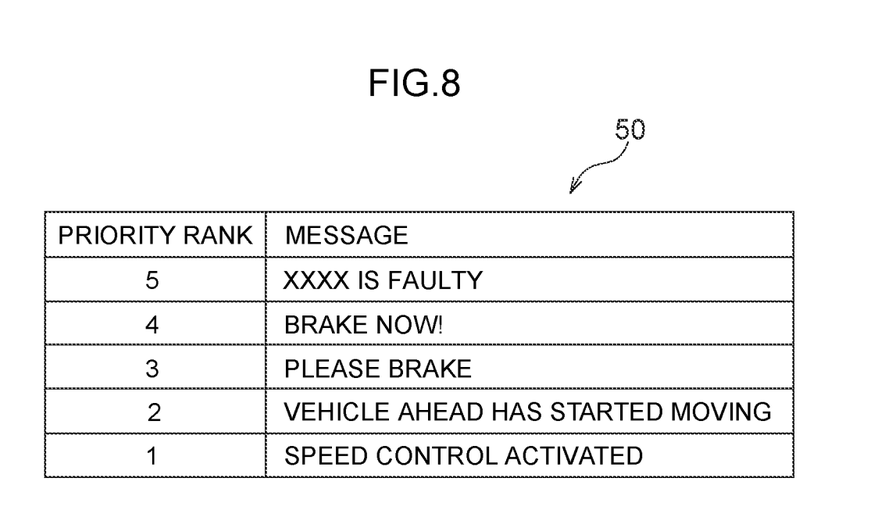
FIG. 8 is a diagram illustrating a message list.
Figure 9:
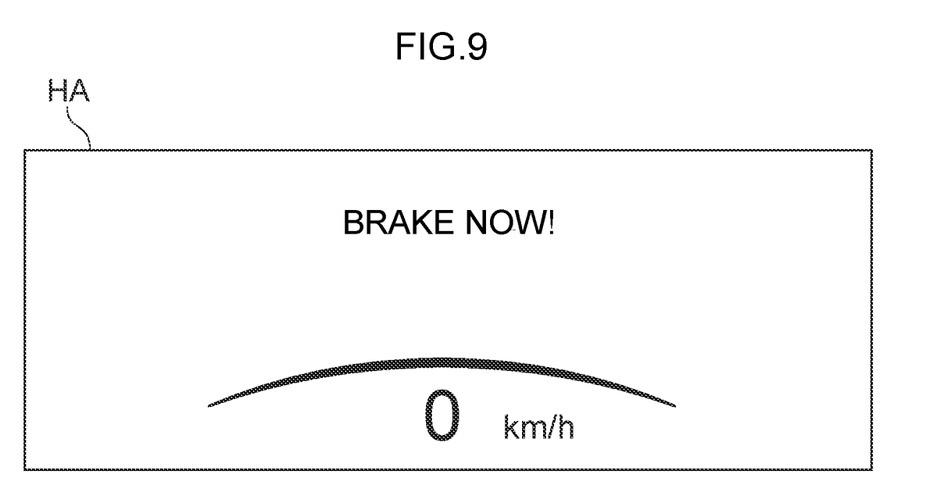
FIG. 9 is a diagram illustrating the display area of the head-up display with a different message to that of FIG. 5 displayed thereon.
Figure 10:
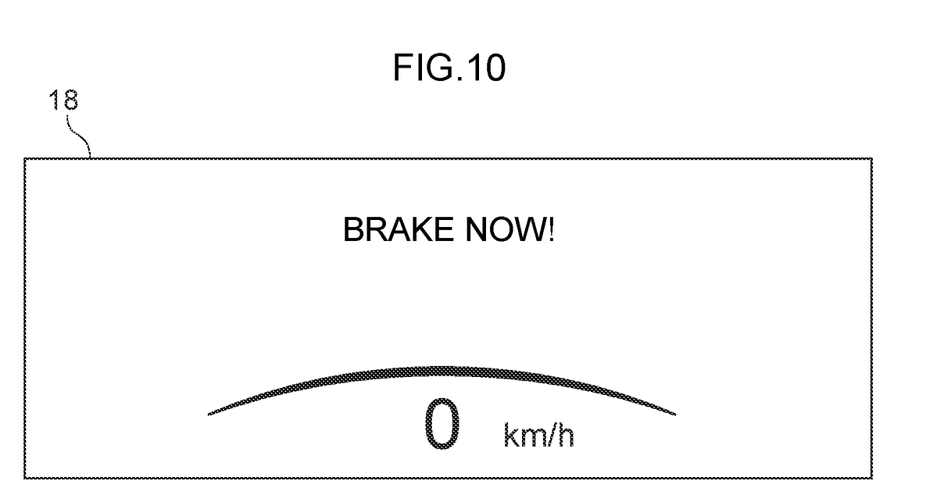
FIG. 10 is a diagram illustrating the meter display with a different message to that of FIG. 4 displayed thereon.

The automatic display section 265 has a function to automatically display a prescribed message on the meter display 18 and the display area HA by controlling the meter display 18 and the HUD 28 when a prescribed condition has been satisfied. FIG. 8 illustrates a message list 50 representing examples of messages generated by the automatic display section 265. The message list 50 is recorded in the ROM 26B or the storage 26D. The message list 50 of the present exemplary embodiment includes five messages. These five messages are also set with a priority rank. The priority rank is higher the bigger the number (level) expressing the priority rank. Moreover, although omitted from illustration, priority ranks are also set for the steering switch image 33RM being displayed on the display area HA when the occupant has performed the first operation on the steering switch 33R, and for the steering switch image corresponding to the steering switch 33L being displayed on the display area HA when the occupant has performed the first operation on the steering switch 33L. The priority rank for the steering switch image 33RM and for the steering switch image corresponding to the steering switch 33L is level 2. The priority rank of level 2 is moreover called the "standard priority rank" in the present exemplary embodiment.

For example, when the above prescribed condition is the vehicle 10 having started specific speed control and the prescribed condition has been satisfied, the automatic display section 265 displays a message "speed control activated" on a meter display 18 and the display area HA. Moreover, when the above prescribed condition is that a stopped leading vehicle has started moving while ACC is being executed for the vehicle 10 and the prescribed condition has been satisfied, then the automatic display section 265 displays the message "vehicle ahead has started moving" on the meter display 18 and the display area HA. Moreover, when the above prescribed condition is that a time to collision (TTC), which changes according to the inter-vehicle distance between the vehicle 10 and the leading vehicle, has become a first prescribed value or less and the prescribed condition has been satisfied, then the automatic display section 265 displays a message "please brake" on the meter display 18 and the display area HA. Moreover, when the above prescribed condition is that the TTC has become a second prescribed value that is less than the first prescribed value, or less, and the prescribed condition has been satisfied, then the automatic display section 265 displays a message "BRAKE NOW" on the meter display 18 and the display area HA. Moreover, when the above prescribed condition is that a specific configuration component of the vehicle 10 has become faulty and the prescribed condition has been satisfied, then a message "the xxxx is faulty" is displayed thereon. Note that "xxxx" represents a name of the configuration component that is faulty.

A set display time for each of the messages displayed by the automatic display section 265 on the meter display 18 and the display area HA is set for each of the messages. Namely, the set display time is set differently for each of the messages. The set display time for each of the messages may, for example, be from 5 seconds to 10 seconds. When the set display time has elapsed, the automatic display section 265 controls the meter display 18 and the HUD 28 so as to clear the message from the meter display 18 and the display area HA. Note that these messages are not limited to text. Namely, images such as icons may be included in these messages.

When the prescribed condition has been satisfied in this manner, the automatic display section 265 displays the prescribed messages automatically on the meter display 18 and the display area HA. However, in cases in which a specific condition has been satisfied, the automatic display section 265 clears the message being displayed on the meter display 18 and the display area HA prior to the set display time elapsing. The content of the specific condition differs between the display area HA and the meter display 18. Description follows regarding the specific condition.

First description follows regarding the specific condition for the display area HA. The specific condition for the display area HA is satisfied when the occupant has performed the first operation on the steering switch 33R or the steering switch 33L while a message of standard priority rank or lower (level 2 or lower) is being displayed on the display area HA by the automatic display section 265 as illustrated in FIG. 5. For example, when the occupant has performed the first operation on the steering switch 33R while a level 2 message is being displayed on the display area HA as illustrated in FIG. 5, the level 2 message is cleared from the display area HA and the steering switch image 33RM is displayed on the display area HA by the HUD 28 controlled by the automatic display section 265, as illustrated in FIG. 6.

Next, description follows regarding a specific condition for the meter display 18. As illustrated in FIG. 4, the specific condition of the meter display 18 is satisfied when the occupant has performed the second operation on the right function switching switch 38R while a message of standard priority rank or lower (level 2 or lower) is being displayed on the meter display 18 by the automatic display section 265. For example, when the occupant continues to position the right function switching switch 38R in the pressed position for a time exceeding the above threshold while the level 2 message is being displayed on the meter display 18, as illustrated in FIG. 4, the level 2 message is cleared from the meter display 18 (not illustrated in the drawings) under control by the automatic display section 265. The above the threshold is, for example, 3 seconds. However, the value of the threshold may be of a different magnitude to 3 seconds.

Operation and Advantageous Effects

Next, description follows regarding the operation and advantageous effects of the present exemplary embodiment.

Figure 11:
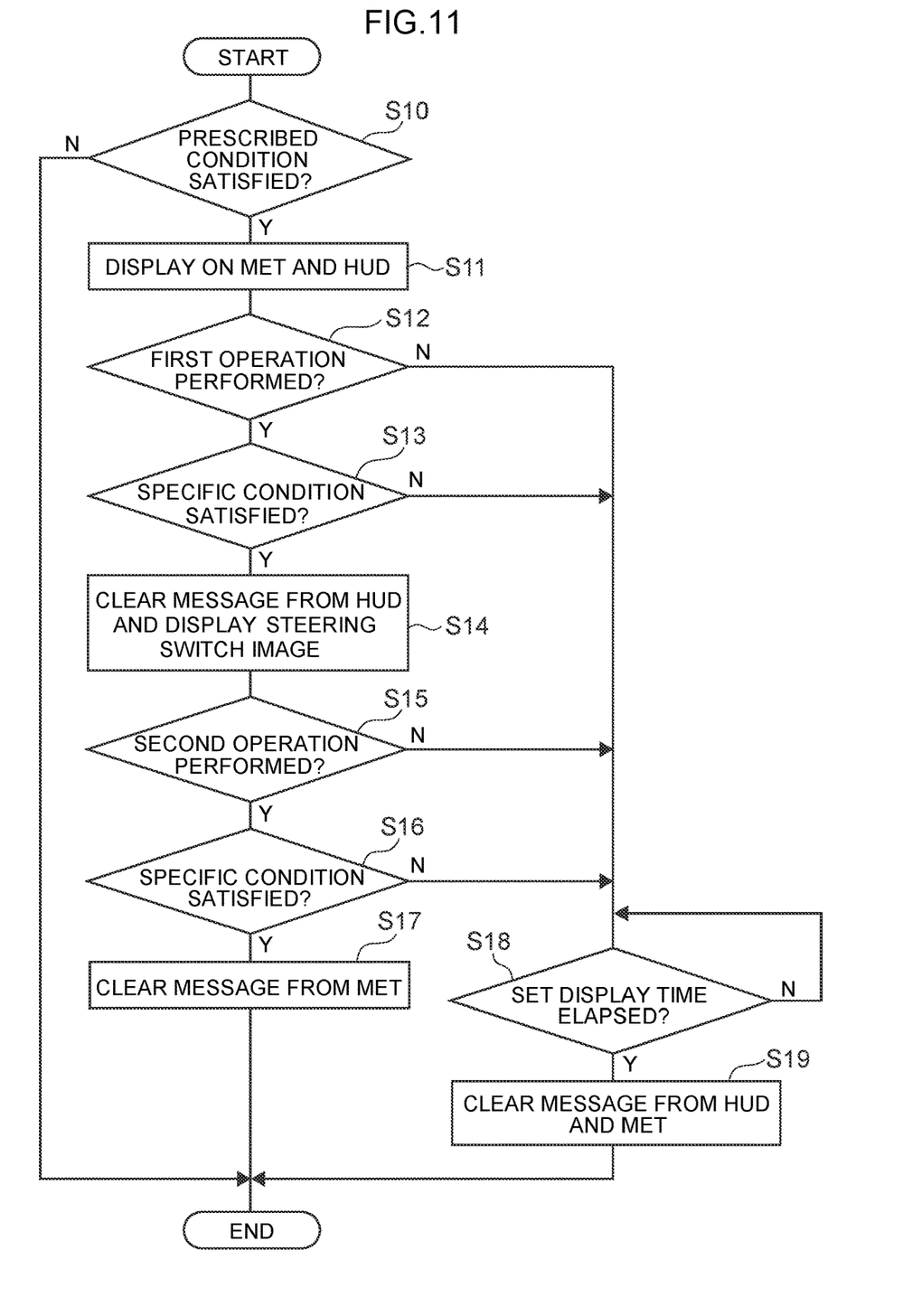
FIG. 11 is a flowchart representing processing executed by the display control ECU.

Description continues regarding the processing executed by the display control ECU 26 of the vehicle 10, with reference to the flowchart of FIG. 11. The display control ECU 26 repeatedly executes the processing of the flowchart illustrated in FIG. 11 every time the prescribed period of time elapses.

At step S10 the automatic display section 265 of the display control ECU 26 determines whether or not the prescribed condition has been satisfied.

The display control ECU 26 proceeds to step S11 when determined YES at step S10, and the automatic display section 265 displays one or other message included in the message list 50 on the meter display 18 and on the display area HA.

The display control ECU 26 proceeds to step S12 when the processing of step S11 has finished, and the automatic display section 265 determines whether or not an occupant has performed the first operation on the steering switch 33R or the steering switch 33L.

The display control ECU 26 proceeds to step S13 when determined YES at step S12, and the automatic display section 265 determines whether or not the specific condition for the display area HA has been satisfied. For example, the automatic display section 265 determines YES at step S13 when the first operation is executed on the steering switch 33R while a message of priority rank of the standard priority rank or lower is being displayed on the display area HA, as illustrated in FIG. 5.

The display control ECU 26 proceeds to step S14 when determined YES at step S13, and the above message is cleared from the display area HA and the steering switch image 33RM is displayed on the display area HA instead by the automatic display section 265 controlling the HUD 28, as illustrated in FIG. 6.

However, the display control ECU 26 determines NO at step S13 when a message of higher priority rank than the standard priority rank is being displayed on the display area HA. This message continues to be displayed as it is on the display area HA in such cases, and the steering switch image 33RM or the steering switch image corresponding to the steering switch 33L is not displayed on the display area HA.

The display control ECU 26 proceeds to step S15 when the processing of step S14 has finished, and the automatic display section 265 determines whether or not the occupant has performed the second operation on the right function switching switch 38R or the left function switching switch 38L.

The display control ECU 26 proceeds to step S16 when determined YES at step S15, and the automatic display section 265 determines whether or not the specific condition for the meter display 18 has been satisfied. For example, the automatic display section 265 determines YES at step S16 when the second operation is executed on the right function switching switch 38R while a level 2 message is being displayed on the meter display 18, as illustrated in FIG. 4.

The display control ECU 26 proceeds to step S17 when determined YES at step S16, and the automatic display section 265 clears the message from the meter display 18.

However, the display control ECU 26 determines NO at step S16 when a message of higher priority rank than the standard priority rank is being displayed on the meter display 18. This message continues to be displayed as it is on the meter display 18 in such cases.

The display control ECU 26 proceeds to step S18 when determined NO at steps S12, S13, S15, or S16, and the display control ECU 26 determines whether or not the set display time for the message being displayed on the meter display 18 or for the message being displayed on the display area HA and the meter display 18 has elapsed.

The display control ECU 26 proceeds to step S19 when determined YES at step S18, and the automatic display section 265 clears the message being displayed on the meter display 18, or the message being displayed on the display area HA and the meter display 18.

The display control ECU 26 temporarily ends the processing of the flowchart of FIG. 11 when determined NO at step S10 or the processing of steps S17, S19 has finished.

In the present exemplary embodiment as described above, the message is cleared from the display area HA when the occupant has performed the first operation while in a state in which the prescribed message is being displayed on the meter display 18 and the display area HA. The message can accordingly be cleared by the intent of the occupant from the display area HA, and so the occupant is less likely to feel bothered than in cases in which the message being displayed on the meter display 18 and the display area HA is unable to be cleared by the intent of the occupant.

Furthermore, the first operation is an operation of part of the body of the occupant touching the steering switch 33R or the steering switch 33L provided to the steering wheel 22. The occupant is accordingly able to clear the message from the display area HA easily.

Moreover, in the present exemplary embodiment the message is cleared from the meter display 18 when the occupant has performed the second operation different to the first operation. Thus there is a lower possibility of the occupant mistakenly clearing the message from the meter display 18 and the display area HA than in cases in which the message is cleared from the meter display 18 and the display area HA when the first operation has been performed. Namely, even suppose the occupant were to perform the first operation mistakenly, the message would still continue be displayed on the meter display 18 as long as the second operation is not performed. Thus in such cases the occupant would be able to check the message generated by the automatic display section 265 by looking at the meter display 18.

Furthermore, the message is cleared from the meter display 18 when the occupant has performed an operation to move the right function switching switch 38R or the left function switching switch 38L, which are each movable between the initial position and the pressed position, to the pressed position. There is accordingly a lower possibility of the occupant mistakenly clearing the message from the meter display 18 than in cases in which the message is cleared from the meter display 18 when part of the body of the occupant has touched the steering switch 33R or the steering switch 33L.

Moreover, in the present exemplary embodiment the steering switch image 33RM or the steering switch image corresponding to the steering switch 33L is displayed on the display area HA when the occupant has performed the first operation on the steering switch 33R or on the steering switch 33L. This accordingly enables the occupant to perceive a positional relationship between the steering switch 33R or the steering switch 33L, and the part of their own body (for example the hand) that performed the first operation by the occupant looking at the display area HA.

Furthermore, when in the present exemplary embodiment the occupant has performed the first operation while in a state in which a message having a priority rank of the standard priority rank or lower (a first message) is being displayed on the display area HA, the message is cleared from the display area HA, and the steering switch image 33RM or the steering switch image corresponding to the steering switch 33L is displayed on the display area HA. This enables the occupant to perceive the steering switch image 33RM or the steering switch image corresponding to the steering switch 33L, which have a priority rank of that of the message or higher, by the occupant looking at the display area HA in such cases.

Moreover, when in the present exemplary embodiment the occupant has performed the first operation while in a state in which a message having a higher priority rank than the standard priority rank (a second message) is being displayed on the display area HA, the message continues to be displayed as it is on the display area HA, and the steering switch image 33RM or the steering switch image corresponding to the steering switch 33L is not displayed on the display area HA. This accordingly enables the occupant to perceive the message having a higher priority rank than the steering switch image 33RM or the steering switch image corresponding to the steering switch 33L by the occupant looking at the display area HA in such cases.

Furthermore, in the present exemplary embodiment, when the occupant has performed the second operation when in a state in which a message having a priority rank that is the standard priority rank or lower (third message) is being displayed on the meter display 18, this message is cleared from the meter display 18. Thus in such cases the occupant does not feel bothered by this message being displayed on the meter display 18.

Furthermore, in the present exemplary embodiment when the occupant has performed the second operation when in a state in which a message having a priority rank higher than the standard priority rank (fourth message) is being displayed on the meter display 18, this message continues to be displayed on the meter display 18. Thus by looking at the meter display 18 the occupant is able to perceive this message even in cases in which the occupant has performed the second operation mistakenly.

Furthermore, in the present exemplary embodiment a set display time for each message on the display area HA for when the first operation is not being performed, and a set display time for each message on the meter display 18 for when the second operation is not being performed, are set for each of the respective messages. This accordingly enables an occupant to be less likely to feel bothered by messages displayed on the meter display 18 and the display area HA.

Although explanation has been given above of a vehicle display control device, a vehicle display device, a vehicle, a vehicle display control method, and a non-transitory recording medium according to exemplary embodiments, the vehicle display control device, the vehicle display device, the vehicle, the vehicle display control method, and the non-transitory recording medium may be implemented with appropriate design modifications within a range not departing from the scope of the present disclosure.

For example, the second operation may be an operation to position the right function switching switch 38R and the left function switching switch 38L in the pressed position at the same time using part of the body of an occupant.

Moreover, the second operation may be an operation to intermittently touch the right function switching switch 38R or the left function switching switch 38L plural times over a short period of time using part of the body of an occupant. In such cases the short period of time is, for example, 1 second, and the plural times is, for example, three times.

As illustrated by the double-dot broken lines in FIG. 1, a cancel switch 60R and a cancel switch 60L may be provide to the steering wheel 22, separately to the right function switching switch 38R and the left function switching switch 38L. The cancel switch 60R and the cancel switch 60L are movable between an initial position and a pressed position. In such cases a message of priority rank of the standard priority rank or lower is cleared from the meter display 18 when the cancel switch 60R has been moved to the pressed position by the part of the body of the occupant. Similarly, the message of priority rank of the standard priority rank or lower is cleared from the meter display 18 when the cancel switch 60L has been moved to the pressed position by the part of the body of the occupant.

The meter display 18 may correspond to a "first display section" in the claims, and the display area HA may correspond to a "second display section" in the claims.

The steering switch image 33RM or the steering switch image corresponding to the steering switch 33L may be displayed on both the meter display 18 and the display area HA at the same time when the first operation has been performed.

The message of standard priority rank displayed on the meter display 18 may be different from the message of standard priority rank displayed on the display area HA. For example, although a message of standard priority rank displayed on the display area HA may have a priority rank of the same level to the priority rank of the steering switch image 33RM and the steering switch image corresponding to the steering switch 33L, the messages of standard priority rank displayed on the meter display 18 may have a different level to the priority rank of the steering switch image 33RM and the steering switch image corresponding to the steering switch 33L.

The set display times of all of the messages contained in the message list 50 may also be the same as each other.

The specific condition of the meter display 18 may be omitted. In such cases the step S16 of the flowchart of FIG. 11 is omitted. Namely, the message is cleared from the meter display 18 at step S17 when determined YES at step S15.

What is claimed is:

1. A vehicle display control device comprising:
   a processor,
   wherein the processor is configured to control a first display section provided at a vehicle and a second display section that is a display section different from the first display section and also provided at the vehicle, such that, when an occupant of the vehicle has performed a first operation while in a state in which a message is being displayed on the first display section and the second display section, the message is cleared from the first display section and the message continues to be displayed on the second display section, wherein,
   the first operation is a prescribed operation with respect to a steering switch provided at a steering wheel of the vehicle;
   the processor controls the first display section such that a steering switch image representing the steering switch is displayed in a case in which the occupant has performed the first operation while in a state in which the message is being displayed on the first display section and the second display section;
   the first display section is capable of displaying a plurality of types of messages having defined priority ranks of display; and
   the processor controls the first display section such that:
   when the occupant has performed the first operation while in a state in which a first message, which is a message having a priority rank equal to or lower than a priority rank of the steering switch image, is being displayed on the first display section, the first message is cleared and the steering switch image is displayed, and
   when the occupant has performed the first operation while in a state in which a second message, which is a message having a priority rank higher than the priority rank of the steering switch image, is being displayed on the first display section, the first message continues to be displayed as it is and the steering switch image is not displayed.

2. The vehicle display control device of claim 1, wherein the first operation is an operation in which part of a body of the occupant touches the steering switch.

3. The vehicle display control device of claim 1, wherein:
   the processor controls the second display section such that, when the occupant has performed a second operation different from the first operation while in a state in which the message is being displayed on the second display section, the message is cleared from the second display section.

4. The vehicle display control device of claim 3, wherein:
   the second display section is capable of displaying a plurality of types of the message having defined priority ranks of display; and
   the processor controls the second display section such that:
   when the occupant has performed the second operation while in a state in which a third message, which is a message having a priority rank equal to or lower than a prescribed standard priority rank, is being displayed on the second display section, the third message is cleared from the second display section, and
   when the occupant has performed the second operation while in a state in which a fourth message, which is a message having a priority rank higher than the standard priority rank, is being displayed on the second display section, the fourth message continues to be displayed as it is.

5. The vehicle display control device of claim 3, wherein a set display time of the message on the first display section for when the first operation is not being performed, and a set display time of the message on the second display section for when the second operation is not being performed, are set for each of the respective messages.

6. The vehicle display control device of claim 3, wherein the second operation is an operation to move a steering switch, which is provided at a steering wheel of the vehicle and is capable of moving between an initial position and a pressed position, to the pressed position.

7. The vehicle display control device of claim 1, wherein the first display section is a head-up display.

8. The vehicle display control device of claim 1, wherein the second display section is a display installed at a vehicle interior of the vehicle.

9. A vehicle display device comprising:
   the vehicle display control device of claim 1;
   the first display section; and
   the second display section.

10. A vehicle comprising the vehicle display device of claim 9.

11. A vehicle display control method comprising:
    by a processor,
    controlling a first display section provided at a vehicle and a second display section that is a display section different from the first display section and also provided at the vehicle, such that, when an occupant of the vehicle has performed a first operation while in a state in which a prescribed message is being displayed on the first display section and the second display section, the message is cleared from the first display section and the message continues to be displayed on the second display section, wherein:

the first operation is a prescribed operation with respect to a steering switch provided at a steering wheel of the vehicle;

the processor controls the first display section such that a steering switch image representing the steering switch is displayed in a case in which the occupant has performed the first operation while in a state in which the message is being displayed on the first display section and the second display section;

the first display section is capable of displaying a plurality of types of messages having defined priority ranks of display; and the processor controls the first display section such that:

when the occupant has performed the first operation while in a state in which a first message, which is a message having a priority rank equal to or lower than a priority rank of the steering switch image, is being displayed on the first display section, the first message is cleared and the steering switch image is displayed, and when the occupant has performed the first operation while in a state in which a second message, which is a message having a priority rank higher than the priority rank of the steering switch image, is being displayed on the first display section, the first message continues to be displayed as it is and the steering switch image is not displayed.

12. A non-transitory recording medium storing a program executable by a computer so as to execute processing, the processing comprising:

controlling a first display section provided at a vehicle and a second display section that is a display section different from the first display section and also provided at the vehicle, such that, when an occupant of the vehicle has performed a first operation while in a state in which a prescribed message is being displayed on the first display section and the second display section, the message is cleared from the first display section and the message continues to be displayed on the second display section, wherein:

the first operation is a prescribed operation with respect to a steering switch provided at a steering wheel of the vehicle;

the processing includes controlling the first display section such that a steering switch image representing the steering switch is displayed when the occupant has performed the first operation while in a state in which the message is being displayed on the first display section and the second display section;

the first display section is capable of displaying a plurality of types of messages having defined priority ranks of display; and the processing includes controlling the first display section such that:

when the occupant has performed the first operation while in a state in which a first message, which is a message having a priority rank equal to or lower than a priority rank of the steering switch image, is being displayed on the first display section, the first message is cleared and the steering switch image is displayed, and when the occupant has performed the first operation while in a state in which a second message, which is a message having a priority rank higher than the priority rank of the steering switch image, is being displayed on the first display section, the first message continues to be displayed as it is and the steering switch image is not displayed.

* * * * *